(12) United States Patent
Seo et al.

(10) Patent No.: US 7,912,338 B2
(45) Date of Patent: Mar. 22, 2011

(54) RECORDING MEDIUM HAVING DATA STRUCTURE FOR MANAGING RANDOM/SHUFFLE REPRODUCTION OF VIDEO DATA RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR); Mi Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/787,160

(22) Filed: Feb. 27, 2004

(65) Prior Publication Data

US 2004/0170388 A1    Sep. 2, 2004

(30) Foreign Application Priority Data

Feb. 28, 2003    (KR) ................ 10-2003-0012861

(51) Int. Cl.
*H04N 5/91* (2006.01)

(52) U.S. Cl. ............... 386/95; 386/45; 386/46; 386/96; 386/125

(58) Field of Classification Search .......... 386/125–126, 386/68–70, 82, 95, 94, 96, 83, 1, 46; 703/11
See application file for complete search history.

(56) References Cited

U.S. PATENT DOCUMENTS

| | | | |
|---|---|---|---|
| 4,777,357 A | 10/1988 | Harada et al. | |
| 5,521,898 A | 5/1996 | Ogasawara | |
| 5,559,808 A | 9/1996 | Kostreski et al. | |
| 5,583,652 A | 12/1996 | Ware | |
| 5,602,956 A | 2/1997 | Suzuki et al. | |
| 5,630,006 A | 5/1997 | Hirayama et al. | |
| 5,633,839 A | 5/1997 | Alexander et al. | |
| 5,651,010 A | 7/1997 | Kostreski et al. | |
| 5,691,972 A | 11/1997 | Tsuga et al. | |
| 5,729,549 A | 3/1998 | Kostreski et al. | |
| 5,732,185 A | 3/1998 | Hirayama et al. | |
| 5,734,788 A * | 3/1998 | Nonomura et al. | ............ 386/126 |
| 5,742,569 A * | 4/1998 | Yamamoto et al. | ........ 369/30.18 |
| 5,745,643 A | 4/1998 | Mishina | |

(Continued)

FOREIGN PATENT DOCUMENTS

CN    1134583    10/1996

(Continued)

OTHER PUBLICATIONS

Office Action for counterpart U.S. Appl. No. 10/777,637 dated Apr. 18, 2008.

(Continued)

*Primary Examiner* — Jamie J Atala
(74) *Attorney, Agent, or Firm* — Harness, Dickey & Pierce, P.L.C.

(57) ABSTRACT

A recording medium having data structures for managing random/shuffle reproduction of video data recorded thereon is disclosed. The recording medium in accordance with the present invention comprises at least one piece of title management information, a playlist directory area storing at least one playlist including at least one playitem, and a stream directory area storing at least one clip of video data associated with the playlist. The title management information includes at least one segment that is associated with at least one playlist in the playlist directory area, and each playitem in the playlist is a unit to be randomized or shuffled during random/shuffle reproduction mode.

18 Claims, 10 Drawing Sheets

U.S. PATENT DOCUMENTS

| | | | |
|---|---|---|---|
| 5,747,136 A | 5/1998 | Shono et al. | |
| 5,771,334 A | 6/1998 | Yamauchi et al. | |
| 5,784,528 A | 7/1998 | Yamane et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |
| 5,884,004 A * | 3/1999 | Sato et al. | 386/98 |
| 5,907,658 A | 5/1999 | Murase et al. | |
| 5,909,257 A | 6/1999 | Ohishi et al. | |
| 5,913,010 A | 6/1999 | Kaneshige et al. | |
| 5,917,781 A | 6/1999 | Kim | |
| 5,923,869 A | 7/1999 | Kashiwagi et al. | |
| 5,933,410 A | 8/1999 | Nakane et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,953,290 A | 9/1999 | Fukuda et al. | |
| 5,987,126 A | 11/1999 | Okuyama et al. | |
| 5,999,694 A | 12/1999 | Yasuda et al. | |
| 5,999,698 A | 12/1999 | Nakai et al. | |
| 6,009,234 A | 12/1999 | Taira et al. | |
| 6,014,495 A | 1/2000 | Moriyama et al. | |
| 6,016,381 A | 1/2000 | Taira et al. | |
| 6,031,962 A | 2/2000 | Sawabe et al. | |
| 6,035,095 A | 3/2000 | Kaneshige et al. | |
| 6,064,385 A | 5/2000 | Sturgeon et al. | |
| 6,064,796 A | 5/2000 | Nakamura et al. | |
| 6,067,400 A | 5/2000 | Saeki et al. | |
| 6,084,581 A | 7/2000 | Hunt | |
| 6,097,676 A | 8/2000 | Fujinami | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,175,681 B1 | 1/2001 | Kaneshige et al. | |
| 6,181,870 B1 | 1/2001 | Okada et al. | |
| 6,181,872 B1 | 1/2001 | Yamane et al. | |
| 6,195,726 B1 | 2/2001 | Hogan | |
| 6,215,746 B1 | 4/2001 | Ando et al. | |
| 6,219,488 B1 | 4/2001 | Mori et al. | |
| 6,222,805 B1 | 4/2001 | Mori et al. | |
| 6,229,952 B1 | 5/2001 | Nonomura et al. | |
| 6,246,402 B1 | 6/2001 | Setogawa et al. | |
| 6,247,022 B1 * | 6/2001 | Yankowski | 707/104.1 |
| 6,282,320 B1 | 8/2001 | Hasegawa et al. | |
| 6,285,825 B1 | 9/2001 | Miwa et al. | |
| 6,292,226 B1 | 9/2001 | Yamanaka et al. | |
| 6,308,005 B1 | 10/2001 | Ando et al. | |
| 6,308,006 B1 | 10/2001 | Yamamoto et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,345,147 B1 | 2/2002 | Mimura et al. | |
| 6,351,442 B1 | 2/2002 | Tagawa et al. | |
| 6,353,613 B1 | 3/2002 | Kubota et al. | |
| 6,356,971 B1 * | 3/2002 | Katz et al. | 710/301 |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,381,404 B1 | 4/2002 | deCarmo | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,392,969 B1 | 5/2002 | Heo | |
| 6,393,430 B1 * | 5/2002 | Van Ryzin | 707/104.1 |
| 6,393,574 B1 | 5/2002 | Kashiwagi et al. | |
| 6,415,101 B1 | 7/2002 | DeCarmo et al. | |
| 6,424,793 B1 | 7/2002 | Setogawa et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,515,101 B1 | 2/2003 | Sheares | |
| 6,532,334 B1 | 3/2003 | Kikuchi et al. | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,570,837 B1 | 5/2003 | Kikuchi et al. | |
| 6,573,819 B1 | 6/2003 | Oshima et al. | |
| 6,580,870 B1 | 6/2003 | Kanazawa et al. | |
| 6,584,277 B2 | 6/2003 | Tsumagari et al. | |
| 6,603,517 B1 | 8/2003 | Shen et al. | |
| 6,615,192 B1 * | 9/2003 | Tagawa et al. | 705/57 |
| 6,618,396 B1 | 9/2003 | Mitui et al. | |
| 6,643,450 B1 | 11/2003 | deCarmo | |
| 6,647,496 B1 | 11/2003 | Tagawa et al. | |
| 6,654,543 B2 | 11/2003 | Ando et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 | 8/2004 | Tanaka et al. | |
| 6,788,883 B1 | 9/2004 | Park et al. | |
| 6,795,499 B1 | 9/2004 | Kato et al. | |
| 6,798,981 B1 | 9/2004 | Yamauchi et al. | |
| 6,801,713 B1 | 10/2004 | Yagawa et al. | |
| 6,832,293 B1 | 12/2004 | Tagawa et al. | |
| 6,859,421 B2 | 2/2005 | Sawabe et al. | |
| 6,901,078 B2 | 5/2005 | Morris | |
| 6,904,227 B1 | 6/2005 | Yamamoto et al. | |
| 6,912,218 B1 | 6/2005 | Jeon | |
| 6,914,863 B2 | 7/2005 | Ono | |
| 6,965,727 B1 | 11/2005 | Sawabe et al. | |
| 6,985,411 B2 | 1/2006 | Kanegae et al. | |
| 6,999,674 B1 * | 2/2006 | Hamada et al. | 386/95 |
| 7,006,758 B1 | 2/2006 | Yamamoto et al. | |
| 7,024,102 B1 | 4/2006 | Inoshita et al. | |
| 7,050,384 B2 | 5/2006 | Sasaki | |
| 7,065,287 B1 | 6/2006 | Heredia et al. | |
| 7,072,573 B2 | 7/2006 | Okada et al. | |
| 7,106,946 B1 | 9/2006 | Kato | |
| 7,113,694 B2 | 9/2006 | Kim et al. | |
| 7,124,303 B2 | 10/2006 | Candelore et al. | |
| 7,236,687 B2 * | 6/2007 | Kato et al. | 386/95 |
| 7,477,833 B2 | 1/2009 | Kato et al. | |
| 7,565,060 B2 | 7/2009 | Hamada et al. | |
| 2001/0014070 A1 | 8/2001 | Ando et al. | |
| 2001/0026679 A1 | 10/2001 | Koshino et al. | |
| 2001/0030710 A1 | 10/2001 | Werner | |
| 2001/0033517 A1 | 10/2001 | Ando et al. | |
| 2001/0036358 A1 | 11/2001 | Kim et al. | |
| 2001/0038745 A1 | 11/2001 | Sugimoto et al. | |
| 2001/0043790 A1 | 11/2001 | Saeki et al. | |
| 2001/0053280 A1 | 12/2001 | Yamauchi et al. | |
| 2002/0001385 A1 | 1/2002 | Kawada et al. | |
| 2002/0015383 A1 | 2/2002 | Ueno | |
| 2002/0015581 A1 | 2/2002 | Ando et al. | |
| 2002/0018416 A1 | 2/2002 | Heo | |
| 2002/0021761 A1 | 2/2002 | Zhang et al. | |
| 2002/0031336 A1 | 3/2002 | Okada et al. | |
| 2002/0041557 A1 | 4/2002 | Heo | |
| 2002/0046328 A1 | 4/2002 | Okada | |
| 2002/0076201 A1 | 6/2002 | Tsumagari et al. | |
| 2002/0093556 A1 | 7/2002 | Ishizawa et al. | |
| 2002/0093886 A1 | 7/2002 | Ijichi et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0114614 A1 | 8/2002 | Nakatani et al. | |
| 2002/0126994 A1 * | 9/2002 | Gunji et al. | 386/83 |
| 2002/0127002 A1 | 9/2002 | Mori et al. | |
| 2002/0129036 A1 | 9/2002 | Ho Yuen Lok et al. | |
| 2002/0131767 A1 | 9/2002 | Auwens et al. | |
| 2002/0135607 A1 | 9/2002 | Kato et al. | |
| 2002/0135608 A1 | 9/2002 | Hamada et al. | |
| 2002/0145702 A1 | 10/2002 | Kato et al. | |
| 2002/0150383 A1 | 10/2002 | Kato et al. | |
| 2002/0159368 A1 | 10/2002 | Noda et al. | |
| 2002/0177914 A1 | 11/2002 | Chase | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 | 1/2003 | Andoh | |

| | | | | | |
|---|---|---|---|---|---|
| 2003/0007780 A1 | 1/2003 | Senoh | EP | 0737009 | 10/1996 |
| 2003/0026597 A1 | 2/2003 | Cho et al. | EP | 0737980 | 10/1996 |
| 2003/0035681 A1 | 2/2003 | Ho | EP | 0831647 | 3/1998 |
| 2003/0046638 A1 | 3/2003 | Thompson | EP | 0836183 | 4/1998 |
| 2003/0058948 A1 | 3/2003 | Kelly et al. | EP | 0836189 | 4/1998 |
| 2003/0086568 A1 | 5/2003 | Kato et al. | EP | 0847198 | 6/1998 |
| 2003/0103604 A1 | 6/2003 | Kato et al. | EP | 0858073 | 8/1998 |
| 2003/0118327 A1 | 6/2003 | Um et al. | EP | 0872839 | 10/1998 |
| 2003/0123346 A1 | 7/2003 | Ishii et al. | EP | 0873022 | 10/1998 |
| 2003/0123845 A1 | 7/2003 | Koda et al. | EP | 0 911 825 | 4/1999 |
| 2003/0123849 A1 | 7/2003 | Nallur et al. | EP | 0 917 149 | 5/1999 |
| 2003/0133509 A1 | 7/2003 | Yanagihara et al. | EP | 0917355 | 5/1999 |
| 2003/0147322 A1 | 8/2003 | Ono | EP | 0918438 | 5/1999 |
| 2003/0161615 A1 | 8/2003 | Tsumagari et al. | EP | 0920203 | 6/1999 |
| 2003/0221055 A1 | 11/2003 | Okada | EP | 0929072 | 7/1999 |
| 2003/0235403 A1 | 12/2003 | Seo et al. | EP | 0940983 | 9/1999 |
| 2003/0235404 A1 | 12/2003 | Seo et al. | EP | 0949622 | 10/1999 |
| 2004/0014136 A1 | 1/2004 | Ishii et al. | EP | 1024494 | 8/2000 |
| 2004/0019396 A1 | 1/2004 | McMahon et al. | EP | 1050880 | 11/2000 |
| 2004/0047588 A1 | 3/2004 | Okada et al. | EP | 1081885 | 3/2001 |
| 2004/0047591 A1 | 3/2004 | Seo et al. | EP | 1103974 | 5/2001 |
| 2004/0047923 A1 | 3/2004 | Turpen et al. | EP | 1126454 | 8/2001 |
| 2004/0076402 A1 | 4/2004 | Jung et al. ............ 386/69 | EP | 1041565 | 9/2001 |
| 2004/0086261 A1 | 5/2004 | Hanes | EP | 1148503 | 10/2001 |
| 2004/0114908 A1 | 6/2004 | Ito | EP | 1 205 933 | 11/2001 |
| 2004/0120694 A1 | 6/2004 | Hamada et al. | EP | 1041569 | 1/2002 |
| 2004/0156621 A1 | 8/2004 | Seo et al. | EP | 1198132 | 4/2002 |
| 2004/0179819 A1 | 9/2004 | Cho et al. | EP | 1198133 | 4/2002 |
| 2004/0179820 A1 | 9/2004 | Kashiwagi et al. | EP | 1202568 | 5/2002 |
| 2004/0179823 A1 | 9/2004 | Jung et al. | EP | 1 271 526 | 1/2003 |
| 2004/0179827 A1 | 9/2004 | Cho et al. | EP | 1280348 | 1/2003 |
| 2004/0208135 A1 | 10/2004 | Nakamura et al. | EP | 1 286 544 | 2/2003 |
| 2004/0213105 A1 | 10/2004 | Seo et al. | EP | 1398965 | 3/2004 |
| 2004/0220791 A1* | 11/2004 | Lamkin et al. ........... 703/11 | EP | 1469677 | 10/2004 |
| 2004/0247290 A1 | 12/2004 | Seo et al. | EP | 1 516 329 | 3/2005 |
| 2004/0252975 A1 | 12/2004 | Cho et al. | EP | 1521463 | 4/2005 |
| 2005/0019007 A1 | 1/2005 | Kato et al. | EP | 1391119 | 6/2006 |
| 2005/0025459 A1 | 2/2005 | Kato et al. | JP | 64-003781 | 1/1989 |
| 2005/0036763 A1 | 2/2005 | Kato et al. | JP | 01-116819 | 5/1989 |
| 2005/0063671 A1 | 3/2005 | Jung et al. | JP | 3-199243 | 8/1991 |
| 2005/0063672 A1 | 3/2005 | Jung et al. | JP | 08-088832 | 4/1996 |
| 2005/0232111 A1 | 10/2005 | Sawabe et al. | JP | 08-235833 | 9/1996 |
| 2006/0013564 A1 | 1/2006 | Hamada et al. | JP | 08-273304 | 10/1996 |
| 2006/0110132 A1 | 5/2006 | Takakuwa et al. | JP | 09-023403 | 1/1997 |
| 2006/0222340 A1 | 10/2006 | Yamauchi et al. | JP | 09-135421 | 5/1997 |
| 2007/0047923 A1 | 3/2007 | Eklund et al. | JP | 09-251759 | 9/1997 |
| 2008/0019672 A1 | 1/2008 | Hamasaka et al. | JP | 10-032780 | 2/1998 |
| 2008/0253742 A1 | 10/2008 | Hamada et al. | JP | 10-040667 | 2/1998 |
| 2009/0180757 A1 | 7/2009 | De Haan | JP | 10-051737 | 2/1998 |
| | | | JP | 10-269698 | 10/1998 |
| FOREIGN PATENT DOCUMENTS | | | JP | 10-271449 | 10/1998 |
| CN | 1163673 | 10/1997 | JP | 10-299698 | 11/1998 |
| CN | 1205793 | 1/1999 | JP | 11-041563 | 2/1999 |
| CN | 1212427 | 3/1999 | JP | 11-069308 | 3/1999 |
| CN | 1220458 | 6/1999 | JP | 11-069309 | 3/1999 |
| CN | 1237852 | 12/1999 | JP | 11-096653 | 4/1999 |
| CN | 1239574 A | 12/1999 | JP | 11-103444 | 4/1999 |
| CN | 1251461 | 4/2000 | JP | 11-120747 | 4/1999 |
| CN | 1251680 | 4/2000 | JP | 11-134812 | 5/1999 |
| CN | 1263345 | 8/2000 | JP | 11-161663 | 6/1999 |
| CN | 1272209 | 11/2000 | JP | 11-185463 | 7/1999 |
| CN | 1310445 | 8/2001 | JP | 11-213522 | 8/1999 |
| CN | 1317200 | 10/2001 | JP | 11-213627 | 8/1999 |
| CN | 1320926 | 11/2001 | JP | 11-259976 | 9/1999 |
| CN | 1321319 | 11/2001 | JP | 11-259985 | 9/1999 |
| CN | 1346491 | 4/2002 | JP | 11-296997 | 10/1999 |
| CN | 1364387 | 8/2002 | JP | 11-346341 | 12/1999 |
| CN | 1383679 | 12/2002 | JP | 2000-001130 | 1/2000 |
| CN | 1393872 | 1/2003 | JP | 2000-021130 | 1/2000 |
| CN | 1509572 | 6/2004 | JP | 2000-030414 | 1/2000 |
| CN | 1555058 | 12/2004 | JP | 2000-041066 | 2/2000 |
| CN | 1571055 | 1/2005 | JP | 2000-067522 | 3/2000 |
| CN | 1606355 | 4/2005 | JP | 2000-069437 | 3/2000 |
| CN | 1606356 | 4/2005 | JP | 2000-113602 | 4/2000 |
| CN | 1606357 | 4/2005 | JP | 2000-149405 | 5/2000 |
| CN | 1611071 | 4/2005 | JP | 2000-149514 | 5/2000 |
| EP | 0 677 842 | 10/1993 | JP | 2000-195235 | 7/2000 |
| EP | 0723216 | 7/1996 | JP | 2000-222822 | 8/2000 |
| EP | 0724264 | 7/1996 | JP | 2000-235779 | 8/2000 |

| | | |
|---|---|---|
| JP | 2000-235780 | 8/2000 |
| JP | 2000-236496 | 8/2000 |
| JP | 2000-293938 | 10/2000 |
| JP | 2000-299836 | 10/2000 |
| JP | 2000-322827 | 11/2000 |
| JP | 2000-322875 | 11/2000 |
| JP | 2000-331466 | 11/2000 |
| JP | 2000-348442 | 12/2000 |
| JP | 2000-348467 | 12/2000 |
| JP | 2001-024985 | 1/2001 |
| JP | 2001-067802 | 3/2001 |
| JP | 2001-111929 | 4/2001 |
| JP | 2001-111960 | 4/2001 |
| JP | 2001-157145 | 6/2001 |
| JP | 2001-157208 | 6/2001 |
| JP | 2001-169246 | 6/2001 |
| JP | 2001-195809 | 7/2001 |
| JP | 2001-297535 | 10/2001 |
| JP | 2001-332006 | 11/2001 |
| JP | 2001-359072 | 12/2001 |
| JP | 2002-025231 | 1/2002 |
| JP | 2002-056651 | 2/2002 |
| JP | 2002-082838 | 3/2002 |
| JP | 2002-083486 | 3/2002 |
| JP | 2002-084488 | 3/2002 |
| JP | 2002-112179 | 4/2002 |
| JP | 2002-112201 | 4/2002 |
| JP | 2002-150685 | 5/2002 |
| JP | 2002-0157838 | 5/2002 |
| JP | 2002-157859 | 5/2002 |
| JP | 2002-158972 | 5/2002 |
| JP | 2002-158974 | 5/2002 |
| JP | 2002-216460 | 8/2002 |
| JP | 2002-222581 | 8/2002 |
| JP | 2002-288942 | 10/2002 |
| JP | 2002-352515 | 12/2002 |
| JP | 3379961 | 12/2002 |
| JP | 2003-006979 | 1/2003 |
| JP | 3392838 | 1/2003 |
| JP | 3392849 | 1/2003 |
| JP | 2003-059241 | 2/2003 |
| JP | 2003-068057 | 3/2003 |
| JP | 2003-087744 | 3/2003 |
| JP | 2003-116100 | 4/2003 |
| JP | 2003-199047 | 7/2003 |
| JP | 2003-520514 | 7/2003 |
| JP | 2003-233952 | 8/2003 |
| JP | 2004-127397 | 4/2004 |
| JP | 2005-513936 | 5/2005 |
| JP | 2005-251392 | 9/2005 |
| KR | 1996-0038743 | 11/1996 |
| KR | 1996-0038744 | 11/1996 |
| KR | 1996-0038901 | 11/1996 |
| KR | 1996-0038905 | 11/1996 |
| KR | 1999-0022858 | 3/1999 |
| KR | 0178246 | 4/1999 |
| KR | 1999-0079482 | 11/1999 |
| KR | 2000-0031861 | 6/2000 |
| KR | 2000-0053633 | 8/2000 |
| KR | 2000-0055028 | 9/2000 |
| KR | 2000-0056179 | 9/2000 |
| KR | 2000-0065876 | 11/2000 |
| KR | 2001-0022702 | 3/2001 |
| KR | 10-0294884 | 4/2001 |
| KR | 2001-0028735 | 4/2001 |
| KR | 2001-0051898 | 6/2001 |
| KR | 2001-0098007 | 11/2001 |
| KR | 2001-0098101 | 11/2001 |
| KR | 2001-0107578 | 12/2001 |
| KR | 2002-0006273 | 1/2002 |
| KR | 2002-0006674 | 1/2002 |
| KR | 2002-0020919 | 3/2002 |
| KR | 2002-094018 | 12/2002 |
| KR | 2002-0097454 | 12/2002 |
| KR | 2002-0097455 | 12/2002 |
| KR | 2004-0000290 | 1/2004 |
| KR | 2004-0030992 | 4/2004 |
| KR | 2004-0030994 | 4/2004 |
| KR | 2004-0030995 | 4/2004 |
| KR | 2004-0041581 | 5/2004 |
| RU | 2229174 C2 | 3/1995 |
| TW | 391548 | 5/2000 |
| WO | WO 97/13361 | 4/1997 |
| WO | WO 97/13363 | 4/1997 |
| WO | WO 97/13364 | 4/1997 |
| WO | WO 97/13365 | 4/1997 |
| WO | WO 97/13366 | 4/1997 |
| WO | WO97/14151 | 4/1997 |
| WO | WO 97/15924 | 5/1997 |
| WO | WO 97/37491 | 10/1997 |
| WO | WO 97/38527 | 10/1997 |
| WO | WO97/39451 | 10/1997 |
| WO | WO 98/00952 | 1/1998 |
| WO | WO 98/09290 | 3/1998 |
| WO | WO 99/08281 | 2/1999 |
| WO | WO 99/38169 | 7/1999 |
| WO | WO 00/02195 | 1/2000 |
| WO | WO 00/05883 | 2/2000 |
| WO | WO 00/42515 | 7/2000 |
| WO | WO 00/46803 | 8/2000 |
| WO | WO 00/60597 | 10/2000 |
| WO | WO 00/62295 | 10/2000 |
| WO | WO 01/35648 | 5/2001 |
| WO | WO 01/35650 | 5/2001 |
| WO | WO 01/52554 | 7/2001 |
| WO | WO 01/82604 | 11/2001 |
| WO | WO 01/82606 | 11/2001 |
| WO | WO 01/82608 | 11/2001 |
| WO | WO 01/82609 | 11/2001 |
| WO | WO 01/82610 | 11/2001 |
| WO | WO 01/82611 | 11/2001 |
| WO | WO 02/075739 | 9/2002 |
| WO | WO 02/079902 | 10/2002 |
| WO | WO 02/080541 | 10/2002 |
| WO | WO 03/047261 | 6/2003 |
| WO | WO 03/058957 | 7/2003 |
| WO | 04/001728 A1 | 12/2003 |
| WO | 04/001750 A1 | 12/2003 |
| WO | 04/001752 A1 | 12/2003 |
| WO | 04/001753 A1 | 12/2003 |
| WO | 04/001754 A1 | 12/2003 |
| WO | WO 04/001728 | 12/2003 |
| WO | WO 04/001749 | 12/2003 |
| WO | WO 04/001750 | 12/2003 |
| WO | WO 04/001752 | 12/2003 |
| WO | WO 04/001753 | 12/2003 |
| WO | WO 2004/032142 | 4/2004 |
| WO | WO 2004/047100 | 6/2004 |
| WO | WO 2004/075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |
| WO | WO 2004/088661 | 10/2004 |
| WO | WO 2004/098183 | 11/2004 |

OTHER PUBLICATIONS

Office Action for counterpart Chinese Patent Application No. 200380100261.0 dated Mar. 7, 2008.
Office Action for counterpart Japanese Patent Application No. 2004-515203 dated May 7, 2008.
Office Action for counterpart Japanese Patent Application No. 2004-515199 dated May 7, 2008.
Office Action for counterpart Japanese Patent Application No. 2004-515216 dated May 7, 2008.
Office Action for counterpart U.S. Appl. No. 10/682,886 dated May 21, 2008.
Office Action for counterpart U.S. Appl. No. 10/372,226 dated May 15, 2008.
Office Action for counterpart U.S. Appl. No. 10/671,017 dated May 14, 2008.
Office Action for counterpart Japanese patent application No. 2004-553264 dated May 20, 2008.
Office Action for Japanese patent application No. 2006-502713 dated Jun. 20, 2008.
Office Action for Japanese patent application No. 2006-507790 dated Jun. 27, 2008.

Office Action for Japanese patent application No. 2006-507735 dated Jun. 27, 2008.
Office Action for U.S. Appl. No. 10/715,398 dated Jul. 3, 2008.
Office Action for U.S. Appl. No. 10/782,866 dated Jul. 25, 2008.
Office Action for U.S. Appl. No. 10/458,243 dated Aug. 6, 2008.
Office Action for U.S. Appl. No. 10/456,474 dated Aug. 5, 2008.
Office Action for U.S. Appl. No. 10/456,476 dated Aug. 6, 2008.
Office Action for U.S. Appl. No. 10/715,462 dated Aug. 29, 2008.
Office Action for U.S. Appl. No. 10/777,637 dated Nov. 25, 2008.
Office Action for Japanese patent application No. 2004-515203 dated Nov. 18, 2008.
Office Action for Chinese patent application No. 200480009338.8 dated Sep. 5, 2008.
Search Report for counterpart European patent application No. 04708081.7-2223/1606803 dated Sep. 12, 2008.
Office Action for U.S. Appl. No. 10/458,278 dated Oct. 6, 2008.
Office Action for Japanese patent application No. 2004-553264 dated Sep. 16, 2008.
Office Action for Australian patent application No. 2003241205 dated Sep. 11, 2008.
Office Action for Australian patent application No. 2003228113 dated Sep. 17, 2008.
Office Action for Australian patent application No. 2003240036 dated Sep. 11, 2008.
Office Action for U.S. Appl. No. 10/715,562 dated Nov. 13, 2008.
Office Action for Australian patent application No. 2003241203 dated Oct. 27, 2008.
Office Action for U.S. Appl. No. 10/458,358 dated Dec. 23, 2008.
Decision on Grant of Patent for Russian patent application No. 2005126860/28(030164) dated Jan. 27, 2009.
Decision on Grant of Patent for Russian patent application No. 2005126865/28(030169) dated Jan. 27, 2009.
Office Action for Japanese patent application No. 2004-515201 dated Mar. 3, 2009.
Office Action for U.S. Appl. No. 10/458,243 dated Mar. 10, 2009.
Office Action for U.S. Appl. No. 10/458,359 dated Apr. 1, 2009.
Office Action for U.S. Appl. No. 10/715,511 dated Apr. 30, 2009.
Office Action for U.S. Appl. No. 10/777,637 dated May 13, 2009.
Search Report for European patent application No. 03730899.6 dated Jun. 16, 2009.
Search Report for European patent application No. 03730901.0 dated Jun. 19, 2009.
Mimura, H. "DVD-Video format," Compcon '97 Proceedings, IEEE San Jose, CA USA Feb. 23-26, 1997, Los Alamitos, CA, USA, IEEE Comput. Soc. US, Feb. 23, 1997, pp. 291-294, XP010219552.
Yamada, H. "DVD Overview removable storage media," Compcon '97, Proceedings, IEEE San Jose, CA, USA Feb. 23-26, 1997, Los Alamitos, CA, USA, IEEE Comput. Soc. S, Feb. 23, 1997, pp. 287-290, XP010219551.
Search Report for European patent application No. 03772919.1 dated Aug. 12, 2009.
Search Report for European patent application No. 03772918.3 dated Aug. 12, 2009.
Office Action for Japanese patent application No. 2004-515202 dated Jul. 28, 2009.
European Search Report dated Nov. 12, 2009.
United States Notice of Allowance for U.S. Appl. No. 10/462,712 dated Dec. 7, 2009.
Korean Office Action dated May 27, 2010 in corresponding Application No. 10-2005-7015057 (without English translation).
Japanese Office Action dated Feb. 5, 2010 in corresponding Application No. 2008-314833 (with English translation).
U.S. Office Action dated Feb. 3, 2010 in corresponding U.S. Appl. No. 10/715,462.
U.S. Notice of Allowance mailed May 8, 2009 issued in corresponding U.S. Appl. No. 10/458,278.
U.S. Office Action mailed Sep. 14, 2009 issued in U.S. Appl. No. 10/458,278.
U.S. Office Action mailed Sep. 15, 2009 issued in corresponding U.S. Appl. No. 10/715,462.
European Search Reported dated Aug. 12, 2009 issued in corresponding Application No. EP 03772920.

* cited by examiner

RECORDING MEDIUM HAVING DATA STRUCTURE FOR MANAGING RANDOM/SHUFFLE REPRODUCTION OF VIDEO DATA RECORDED THEREON AND RECORDING AND REPRODUCING METHODS AND APPARATUSES

1. TECHNICAL FIELD

The present invention relates to a recording medium having a data structure for managing reproduction of at least video data recorded thereon as well as methods and apparatuses for reproduction and recording.

2. BACKGROUND ART

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

FIG. 1 illustrates the file structure of the BD-RW. The file structure or data structure provides for managing the reproduction of the video and audio data recorded on the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips.

The CLIPINF directory includes a clip information file associated with each A/V stream file. The clip information file indicates, among other things, the type of A/V stream associated therewith, number of source packets in the A/V stream associated therewith, and timing information of the source packets in the A/V stream associated therewith (e.g., on an arrival time basis (ATC) and/or a system time basis (STC)).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., ATC or STC basis). Expressed another way, the playlist file identifies playitems, each playitem points to a clip or portion thereof and identifies the clip file associated with the clip.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

3. DISCLOSURE OF INVENTION

It is an object of the present invention to provide a recording medium having a data structure for managing reproduction of video data recorded thereon, and methods and apparatuses for recording and reproducing video data on such a recording medium.

It is another object of the present invention to provide a recording medium having data structure for enabling random/shuffle reproduction of video data recorded thereon in units of playlists or designated intervals of playitems, and methods and apparatuses for recording and reproducing video data on such a recording medium.

A data structure of a recording medium for managing random/shuffle reproduction of video data recorded thereon in accordance with one embodiment of the present invention comprises title management information for at least one piece of title management information, a playlist directory area storing at least one playlist including at least one playitem, and a stream directory area storing at least one clip of video data associated with the playlist. The title management information includes at least one segment that is associated with at least one playlist in the playlist directory area, and each playitem in the playlist is a unit to be randomized or shuffled during random/shuffle reproduction mode.

4. BRIEF DESCRIPTION OF DRAWINGS

The above features and other advantages of the present invention will be more clearly understood from the following detailed description taken in conjunction with the accompanying drawings, in which.

5. MODES FOR CARRYING OUT THE INVENTION

In order that the invention may be fully understood, preferred embodiments thereof will now be described with reference to the accompanying drawings.

Figure 1:
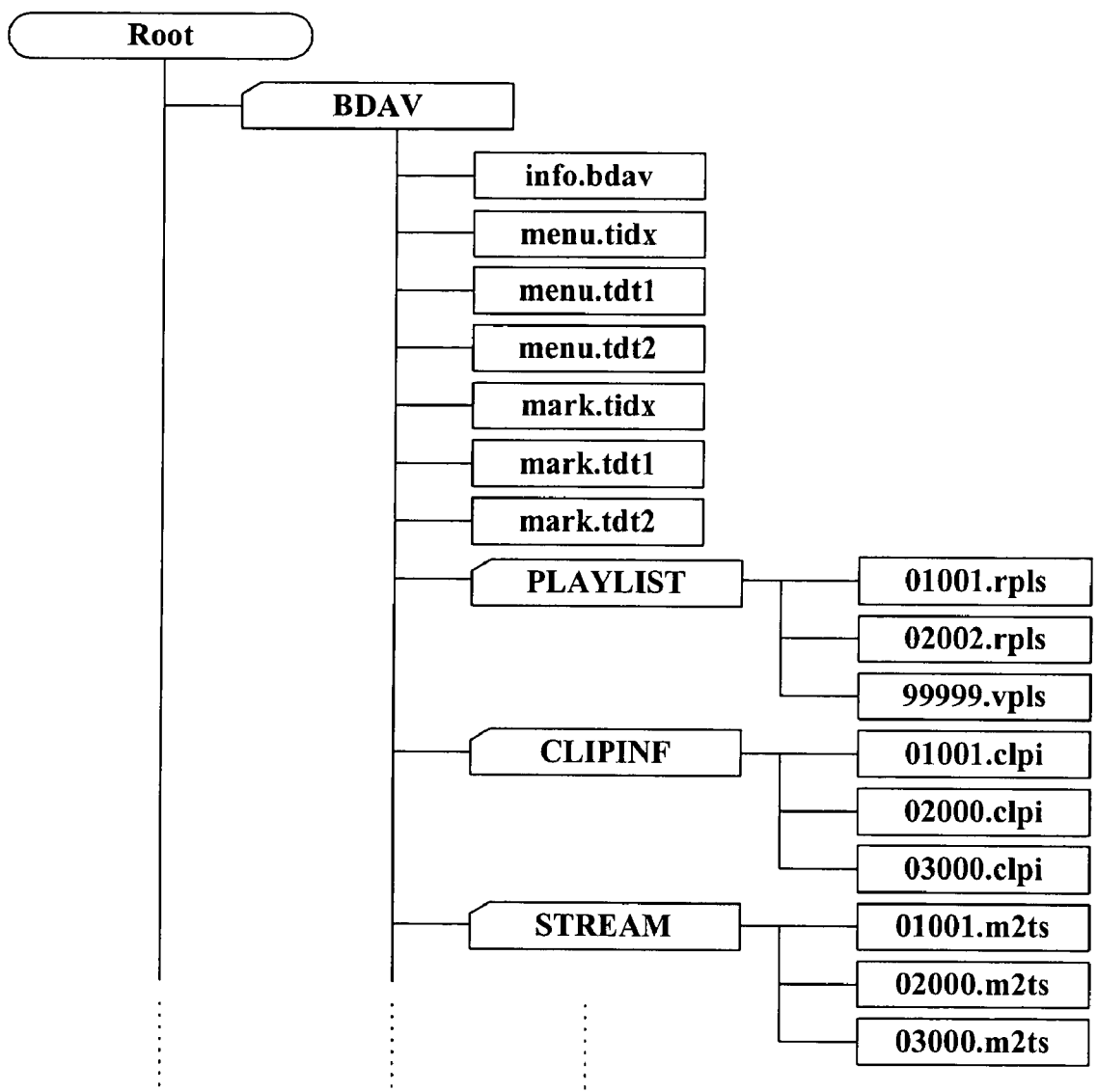
FIG. 1 illustrates the prior art file or data structure of a rewritable optical disk according to the Blu-ray Disc Rewritable (BD-RW) standard.
Figure 2:
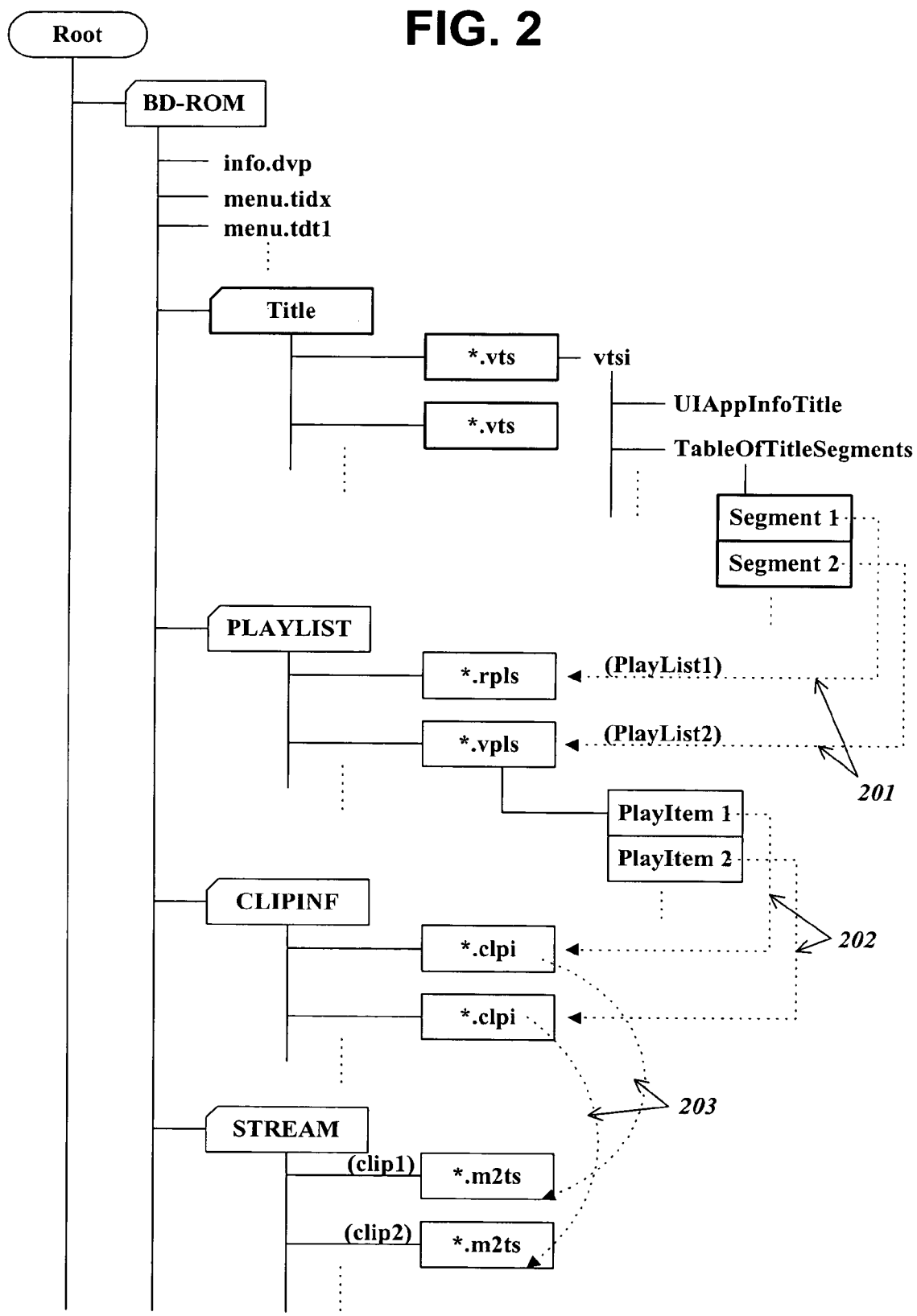
FIG. 2 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RE standard discussed with respect to FIG. 1. As such these aspects will not be described in great detail.

As shown in FIG. 2, the root directory contains at least one BD-ROM directory. The BD-ROM directory includes a general information file info.dvp, menu files menu.tidx, menu.tdt1 among others, a TITLE directory in which title management files (*.vts) are stored, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory.

Figure 3:
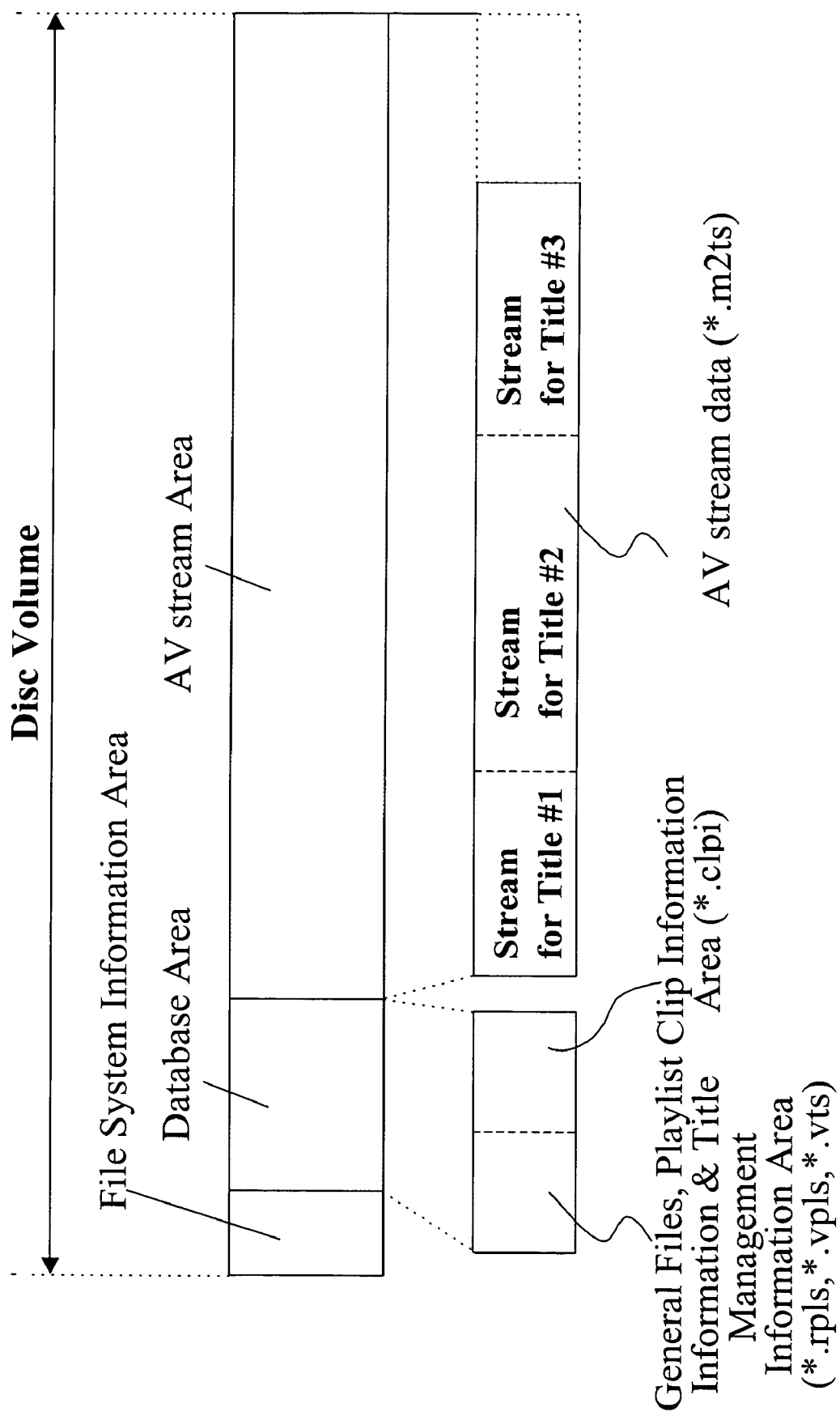
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist and title management information area and a clip information area. The general information file and playlist and title management information area have the general information file recorded in a general information file area thereof, the TITLE directory and title management information files (*.vts) recorded therein, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles. A title is a logical unit for a user to recognize one playback group, for example, different movies represented by the video and audio data are organized as different titles. Furthermore, a title may be organized into individual chapters in the same way a book is often organized into chapters.

Because of the large storage capacity of the newer, high-density recording media such as BD-ROM optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

The multiple reproduction path video data can be reproduced on random/shuffle reproduction mode upon a user's request. As will be described in detail below, the data structures according to the invention may include management information and/or navigation information that enables random/shuffle reproduction mode.

The data structures according to the present invention may be applicable to the manufacturing process of a read-only disk like BD-ROM.

Figure 4:
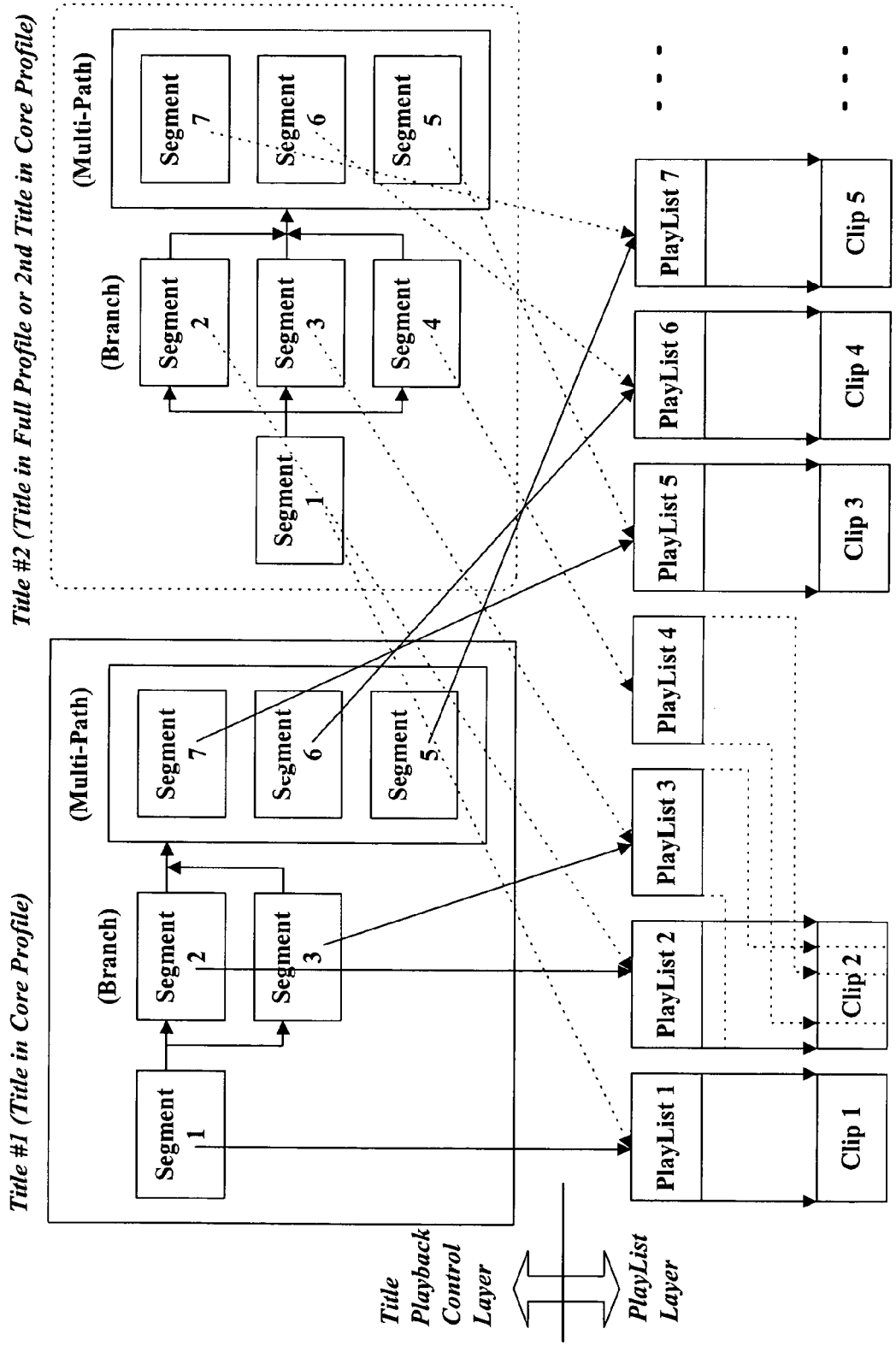
FIG. 4 illustrates an example of a data structure for managing an A/V clip recorded on Blu-ray ROM disk according to the present invention.

FIG. 4 shows a data structure for managing reproduction of multiple reproduction path video data stream that are recorded on physical data recording area in a read-only disk like BD-ROM as a plurality of A/V clip files.

One title includes at least one title segment, each title segment corresponding to one or more playlists. The playback sequence of a title is determined among various playback sequences by setting a title segment sequence. The title segments may be written by using programs like 'Java Script'.

Each title segment is associated with a playlist. A playlist is linked to a whole or portion of a clip file. In this way, a title segment may be associated with a whole or portion of a clip file and thus multiple playback sequences of a title can be generated.

For example, a title may be a core profile for including only movie contents or a full profile including a director's cut additionally. A full profile is formed by adding the playlist corresponding to a director's cut clip to the core profile of the title. Title files of core profile and full profile may be recorded onto distinct directories. For example, the title files of the core profile are recorded in a TITLE directory while those of the full profile are recorded in a FULLTITLE directory. Or, video data of the full profile may be recorded as clip files not in a STREAM directory but in a CONTENTS directory.

A data structure for managing an A/V clip recorded on Blu-ray ROM disk according to the present invention is described below in detail with reference to an embodiment of FIG. 4. To be specific, the first title, title #1 consists of six title segments: one primary path title segment (segment 1), two branch title segments (segments 2, 3), and three multi-path title segments (segments 5, 6, 7).

While segment 2 is associated with playlist 2 that is linked to a whole A/V stream data of clip 2, segment 3 is associated with playlist 3 that is linked to a portion of A/V stream data of clip 2.

Multi-path segments, Segments 5, 6, and 7 are associated with playlists 5, 6, and 7, respectively. Multi-path segments may be created to provide different language versions of the same presentation interval. For example, clip 3 associated with playlist is a Korean language version. Clip 4 (associated with playlist 6) and clip 5 (playlist 7) may be English and Japanese versions, respectively.

Title #2 may be an auxiliary title for title #1 or another separate title. Title #2 consists of seven segments: one primary path title segment (segment 1), three branch title segments (segments 2, 3, 4), and three multi-path title segments (segments 5, 6, 7).

A playlist may be associated with two or more title segments that belong to distinct titles.

Each title segment includes, among other things, reference information on the corresponding playlist, e.g., a filename or the playlist number, a command set including pre-commands and post-commands for the playlist, another command set including commands for playitems belonging to the playlist, and playlist attribute information like still duration.

Figure 5:
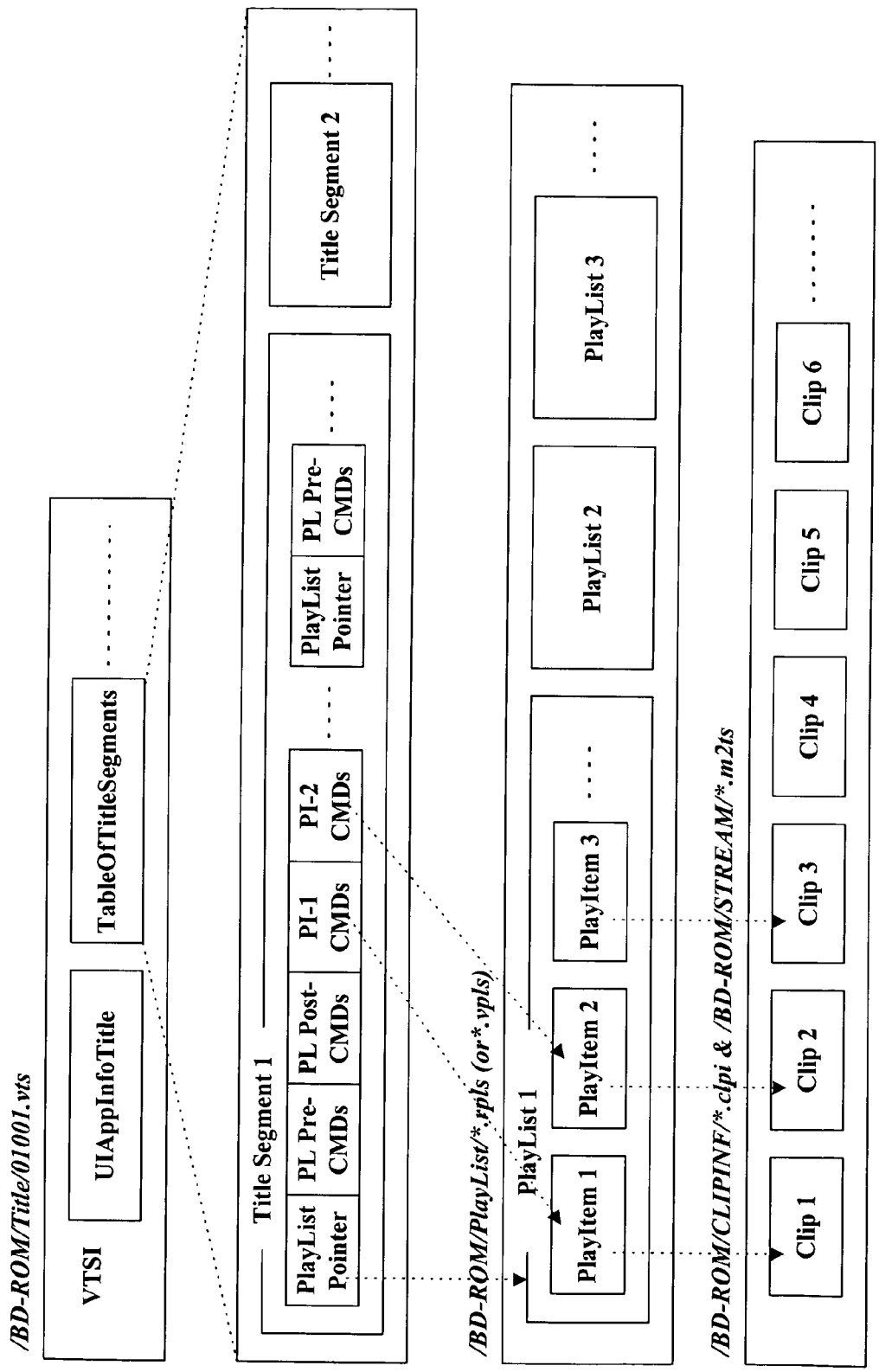
FIG. 5 illustrates an example of a file hierarchical structure for embodying the data structure of FIG. 4.

A title management information file in accordance with the present invention will be described below in detail with reference to FIG. 5. As shown, a title management information file, '01001.vts' includes a title management information 'VTSI' that, among other things, includes a user interface application information, UIAppInfTitle and a title segment table, TableofTitleSegment.

The title segment table includes title segments, e.g., title segments 1, 2. Each title segment includes a playlist pointer (PlayList Pointer), playlist pre-commands (PL Pre-CMDs), playlist post-commands (PL Post-CMDs), and playitem commands (PI-CMDs) for the playitems belonging to the playlist.

The playlist pointer points to one of playlist files (*.rpls or *.vpls) in a PLAYLIST subdirectory. As alluded above, the playlist pointer may be filename of the playlist file or a playlist consecutive number.

The playlist pre-command includes initial setting that is needed to execute before reproduction of an A/V clip that is linked to the playlist pointed by the playlist pointer. The playlist post-command includes post operations, for example, reset or reproduction path configuration for the subsequent reproduction that are generally required to execute after reproduction of the A/V clip linked to the playlist pointed by the playlist pointer is finished. One title segment may include a plurality set of playlist pointers, playlist pre-commands, and playlist post-commands.

Each playitem belonging to a playlist is linked to an A/V clip file (*.m2ts) in a STREAM subdirectory based on clip information files (*.clpi) in a CLIPINF subdirectory. The linkage between playitem and clip file is illustrated in detail in FIG. 2. Once a title management file (*.vts) in a TITLE subdirectory is specified, title segments are obtained based on TableOfTitleSegment from the title management information VTSI in the specified title management file.

Each title segment is linked to at least one playlist file in a PLAYLIST subdirectory (indicated by 201 in FIG. 2). Each playitem corresponding to the playlist file is linked to clip information files (*.clpi) in a CLIPINF subdirectory (indicated by 202 in FIG. 2), each of which is associated with A/V clip files (*.mt2s) in a STREAM subdirectory (indicated by 203 in FIG. 2).

Figure 6:
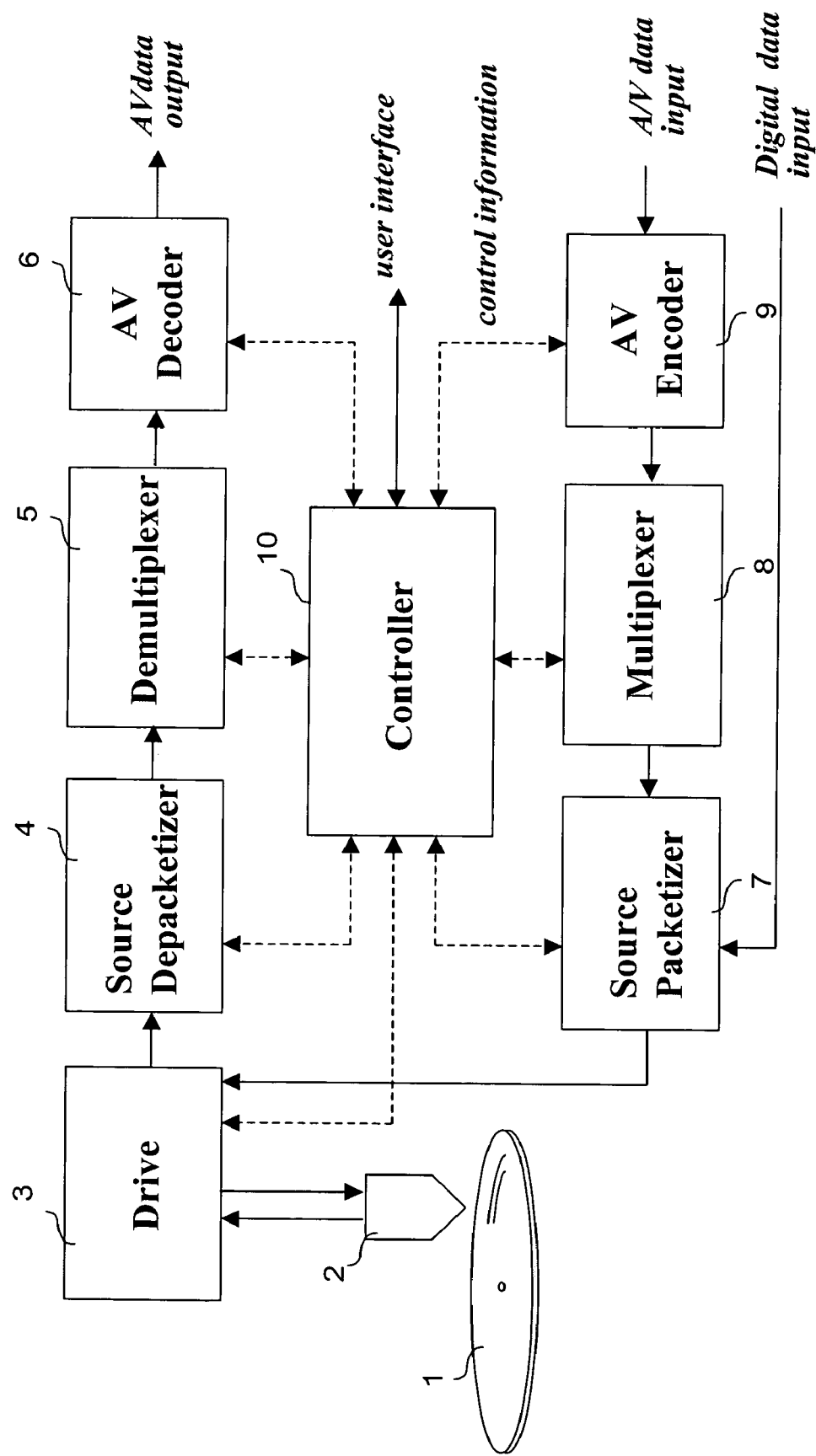
FIG. 6 illustrates a schematic diagram of an embodiment of an optical disk recording and reproduction apparatus of the present invention.

FIG. 6 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 6, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2 to 5 and FIG. 5, 6, 7 or 8, that will be explained later, on the optical disk.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a reproduction path or a title to reproduce. This user input may be specified, for example, via a menu based graphical user interface preprogrammed into the controller 10. Using the user input and the reproduction path management information reproduced from the optical disk, the controller 10 controls the reproduction of the specified path.

For example, if a title is chosen, all title segments included in a title management information file for the chosen title are examined by the controller 10, and the user is requested which path to reproduce. If a reproduction path is selected, the controller 10 searches for A/V clip files based on the title segments related with the selected path, and reproduces the A/V clip files sequentially.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 6 has been described as a recording and reproducing apparatus, it will be understood that only a recording or only a reproducing apparatus may be provided using those portions of FIG. 6 providing the recording or reproducing function.

The processes of locating and reproducing an A/V clip file recorded on the optical disk in accordance with the present invention are described below in great detail.

After obtaining a title segment, the controller 10 accesses the corresponding playlist by referencing a playlist pointer in the title segment. Prior to reproduction, the initial setting operation is executed by using playlist pre-commands (PL Pre-CMDs) stored in the title segment. Then, the A/V clip file to reproduce is accessed by referencing one or more playitems belonging to the playlist. If the title segment includes playitem commands for the playitem being accessed, operations specified by the playitem commands are executed before reproduction of the corresponding A/V clip file. After reproduction of all of the playitems in the playlist is finished, a new title segment or a path to reproduce sequentially is identified based on the playlist post-commands (PL Post-CMDs) of the playlist. Then, the operations are executed that are required to reproduce the next title segment.

Data structures for enabling random/shuffle reproduction of an A/V clip file recorded on an optical disk according to the present invention are described below in great detail.

Figure 7:
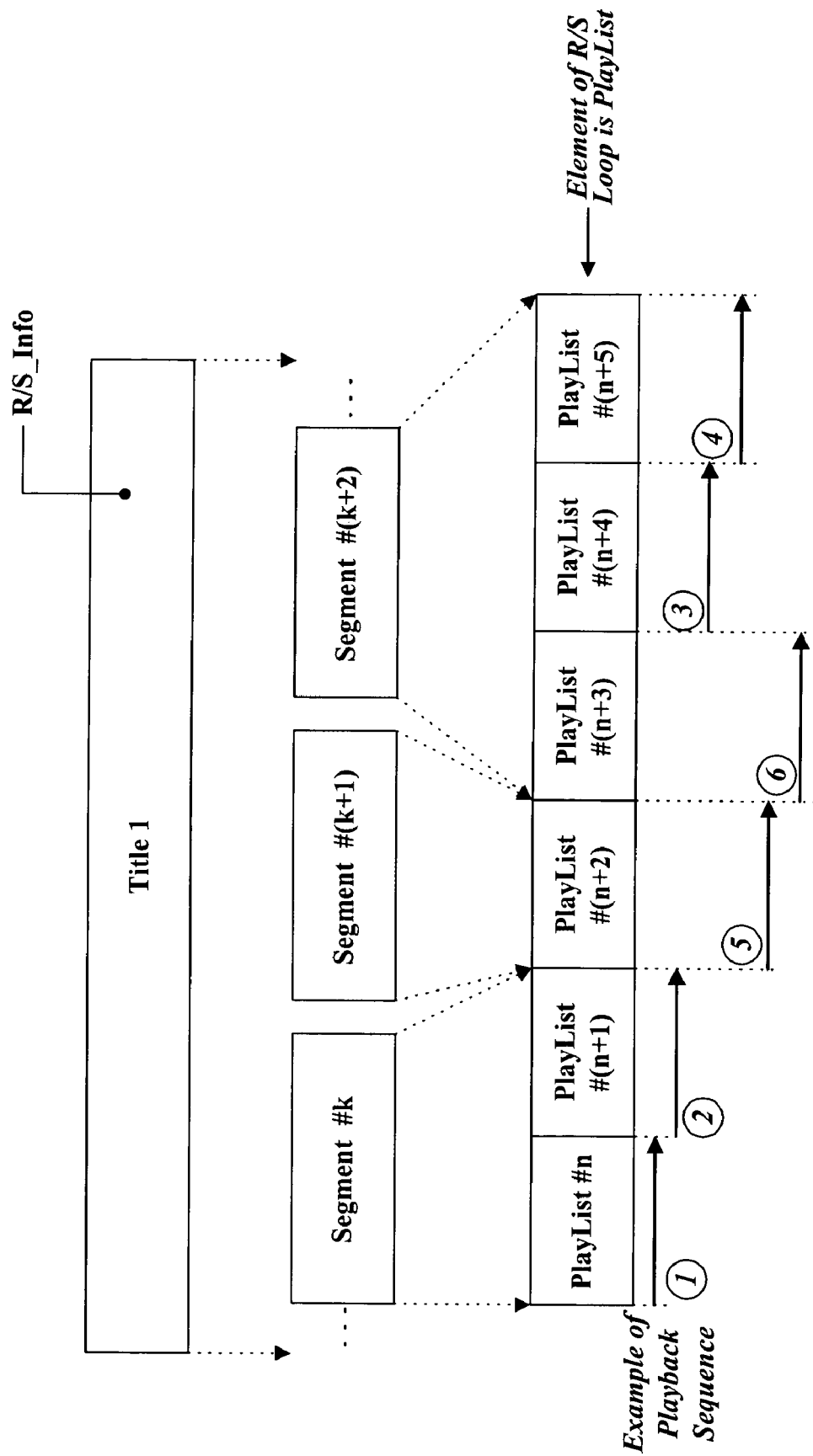
FIGS. 7 to 10 illustrate embodiments of data structures for enabling random/shuffle reproduction of an A/V clip according to the present invention.

An embodiment of a data structure for enabling random/shuffle reproduction in units of playlists is illustrated in FIG. 7 and is described below in detail. In this embodiment, a title is referred to as a random/shuffle title.

Random/shuffle reproduction information of the title 1, R/S_Info is stored as a portion of title management information. In the random/shuffle reproduction information, R/S_Info, random/shuffle reproduction blocks are designated in terms of a group of playlists, e.g., PlayList #n to PlayList #(n+5) or a group of title segments, e.g., Segment #k to Segment #(k+2). The k-th segment, Segment #k is associated with PlayLists #n and #(n+1), Segment #(k+1) is associated with PlayList #(n+2), and Segment #(k+2) is associated with PlayLists #(n+3), #(n+4), #(n+5).

While the disk reproducing apparatus of FIG. 6 reproduces an A/V clip file recorded on the optical disk in accordance with the data structure of FIG. 7, when the controller 10 comes to reproduce a random/shuffle reproduction block or a group of playlists that is designated as a random/shuffle block in R/S_Info, one playlist is selected randomly among the random/shuffle reproduction playlists and is then reproduced. Under random reproduction mode, upon completion of reproduction of the selected playlist, another playlist is chosen randomly again among the playlists. If shuffle reproduction mode is on, a new playlist is selected among the other playlists that have not been reproduced. In this way, a random/shuffle reproduction loop forms based on the random/shuffle reproduction information.

FIG. 7 also shows that the random/shuffle reproduction playlists, PlayList #n to #(n+5) have been reproduced in the shuffle reproduction mode in order of PlayList #n, #(n+1), #(n+4), #(n+5), #(n+2), and #(n+3). In the shuffle mode, after reproduction of all of the random/shuffle reproduction playlists is finished, the first playlist of the next title segment outside the random/shuffle reproduction loop is accessed for the subsequent reproduction. If random mode is on, after the random/shuffle reproduction playlists are reproduced repeatedly the randomly determined number of times, the first playlist of the next title segment outside the random/shuffle reproduction loop is accessed for the subsequent reproduction.

Figure 8:
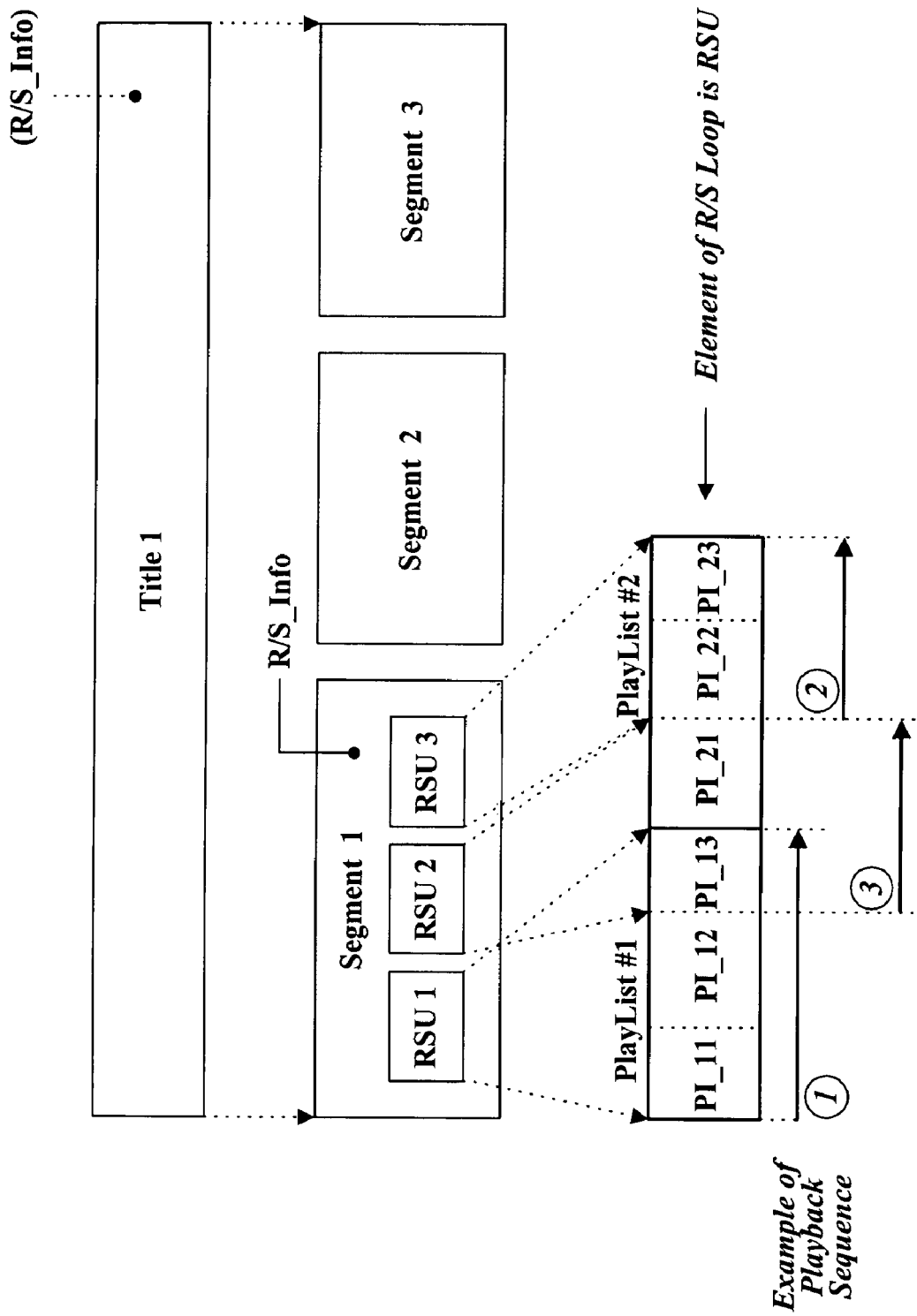

An embodiment of a data structure for enabling random/shuffle reproduction based on random/shuffle block units that are specified and included in the title segment is illustrated in FIG. 8 and is described below in detail. In this embodiment, the title segment having random/shuffle block units is referred to as a random/shuffle title segment.

Random/shuffle reproduction information, R/S_Info may be recorded in a random/shuffle title segment, but may be recorded as a portion of the title management information as in the embodiment of FIG. 7. Information on the random/shuffle block units is included in R/S_Info. The random/shuffle title segment includes the random/shuffle block units, each of which may be defined and specified in units of playlists or playitems.

To be more specific, the random/shuffle title segment, Segment 1 includes three random/shuffle block units, RSU 1, 2, 3. While RSU 1 points to a whole PlayList #1, RSU 2 points to both the third playitem of PlayList #1, PI_13 and the first playitem of PlayList #2, PI_21. RSU 3 points to the two playitems of PlayList #2, PI_22 and PI_23.

While the disk reproducing apparatus of FIG. 6 reproduces an A/V clip file recorded on the optical disk in accordance with the data structure of FIG. 8, when the controller 10 comes to reproduce segment 1, the controller 10 chooses one of the random/shuffle block units of segment 1 randomly. A playlist or playitem pointed by the chosen random/shuffle block unit is identified and an A/V clip file is then reproduced that is linked to the playlist or playitem. FIG. 8 also shows that the random/shuffle block units have been reproduced in order of RSU 1, RSU 3, and RSU 2.

Figure 9:
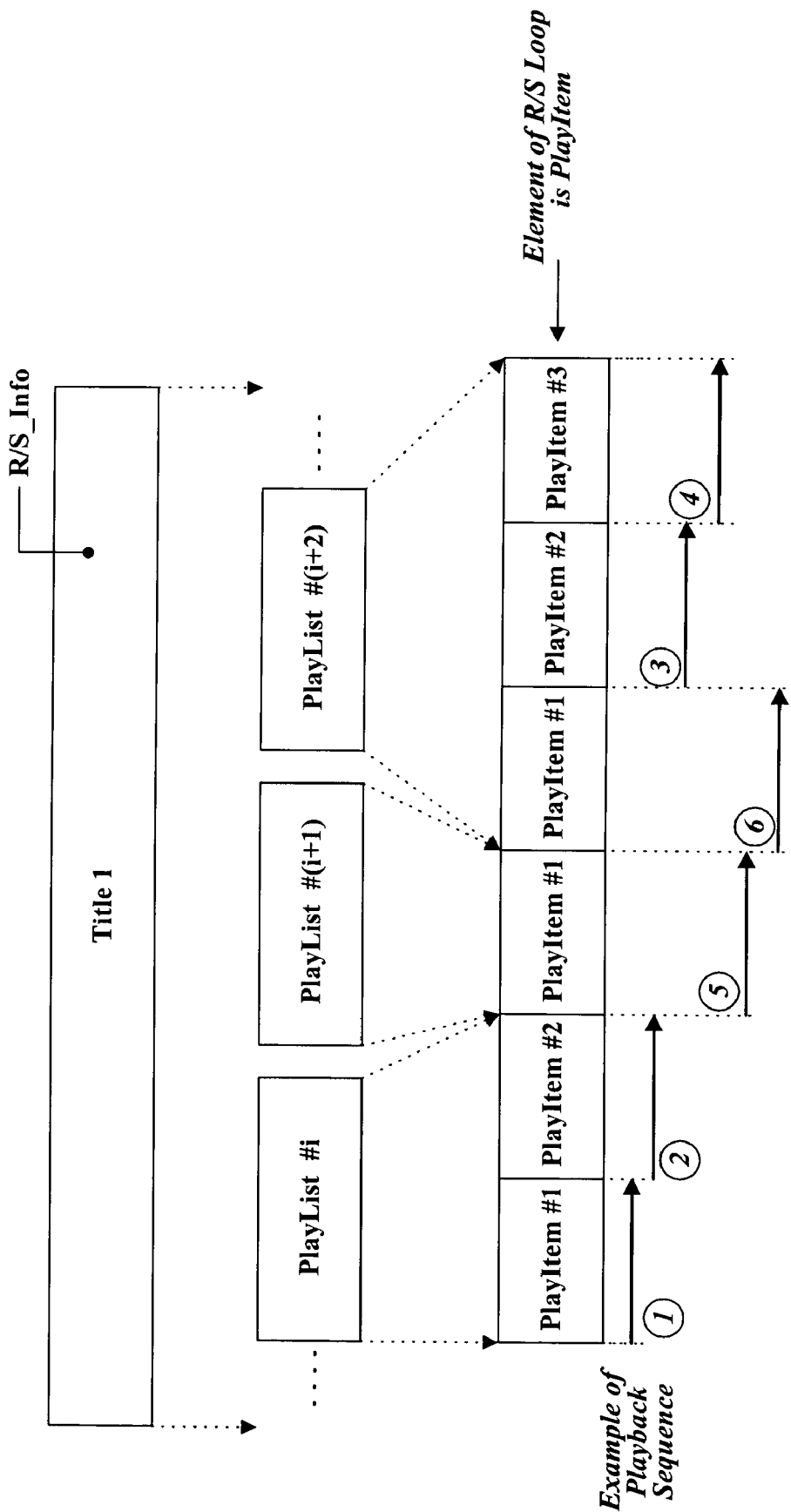

An embodiment of a data structure for enabling random/shuffle reproduction in units of playitems is illustrated in FIG. 9 and is described below in detail. In this embodiment, a title itself is designated as a random/shuffle title.

Random/shuffle reproduction information, R/S_Info may be recorded in a playlist or as a portion of the title management information as in the embodiment of FIG. 7. Random/shuffle reproduction blocks may be a group of playlists (PlayList #i, #(i+1), #(i+2) of FIG. 9) or a group of playitems. In addition, random/shuffle reproduction blocks may be composed of only one playlist.

To be specific, PlayList #i, one of the random/shuffle reproduction playlist points to two playitems, PlayList #(i+1) points to one playitem, and PlayList #(i+2) points to three playitems.

While the disk reproducing apparatus of FIG. 6 reproduces an A/V clip file recorded on the optical disk in accordance with the data structure of FIG. 9, when the controller 10 comes to reproduce a group of random/shuffle playlists, then one playitem is chosen among all of the playitems pointed by playlists in the random/shuffle playlist group and the chosen playitem is then reproduced. For example, one playitem is selected among six playitems in the case of FIG. 9.

After reproduction of the selected playitem is finished, the next playitem is chosen randomly again from the random/shuffle playlist group. If shuffle reproduction mode is on, a new playitem is selected among the other playitems pointed by the random/shuffle playlist group that have not reproduced. In this way, a random/shuffle reproduction loop forms based on the random/shuffle reproduction information.

FIG. 9 also illustrates that, in the shuffle reproduction mode, playitems in the random/shuffle playlist group have been reproduced in order of PlayItem #1, #2 of PlayList #i, PlayItem #2, #3 of PlayList #(i+2), PlayItem #1 of PlayList #(i+1), and PlayItem #1 of PlayList #(i+2). In the shuffle mode, if reproduction of all of the playitems linked to the random/shuffle playlist group is complete, the first playlist of the next title segment outside the random/shuffle reproduction loop is ready to be reproduced.

Figure 10:
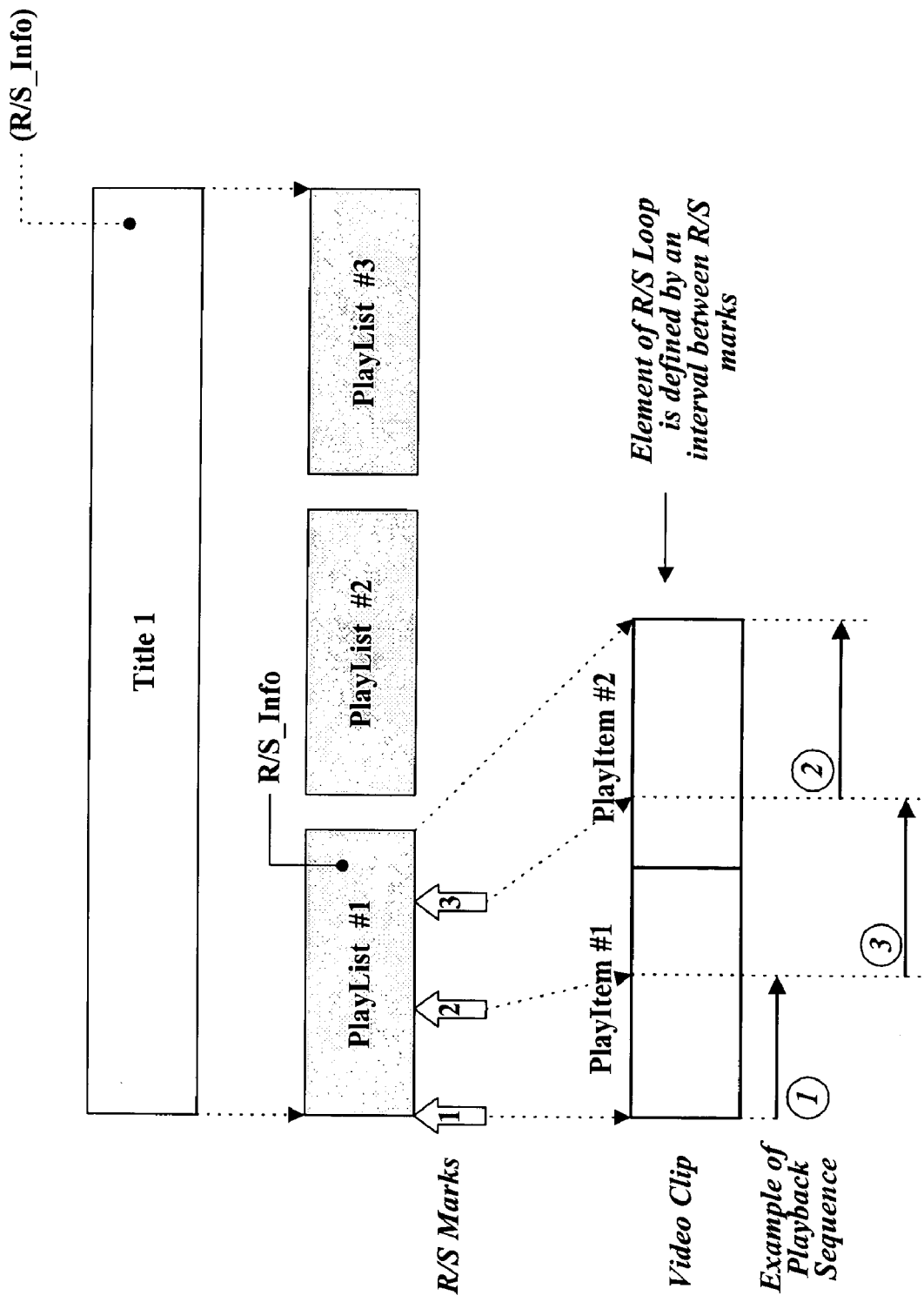

An embodiment of a data structure for enabling random/shuffle reproduction based on random/shuffle marks is illustrated in FIG. 10 and is described below in detail.

Playlist random/shuffle reproduction information may be recorded in the corresponding playlist or as a portion of the title management information as in the embodiment of FIG. 7. The playlist marked as a random/shuffle reproduction playlist includes information on random/shuffle marks, R/S_Mark. Random/shuffle mark information includes pointer information specifying a particular position on the A/V clip file corresponding to the playlist. In the embodiment of FIG. 10, three random/shuffle marks are stored in PlayList #1, which generate three random/shuffle reproduction intervals. In this embodiment, the start position of the A/V clip should be marked by a random/shuffle mark.

When the disk reproducing apparatus of FIG. 6 reproduces a random/shuffle playlist or PlayList #1 of the title recorded on the optical disk in accordance with the data structure of FIG. 10, the controller 10 chooses one of the random/shuffle marks among the random/shuffle mark group, and reproduces an interval between the chosen mark and the following random/shuffle mark on the corresponding A/V clip. Upon completion of reproduction of the interval, another random/shuffle mark is selected randomly again in the random mode. If shuffle mode is on, a new one is selected among the other random/shuffle marks that have not been chosen. Then, a portion of the A/V clip from the newly chosen mark to the following mark is reproduced. And then, the next random/shuffle mark is chosen again. FIG. 10 also illustrates a playback sequence generated by the selection order of the random/shuffle marks, e.g., R/S_Mark #1, #3, and #2.

The present invention, disclosed with respect to a limited number of embodiments, provides a greater level of flexibility in the random/shuffle reproduction of video data than previously available.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

The invention claimed is:

1. A recording medium having a data structure for managing random/shuffle reproduction of video data, the recording medium comprising:
   a stream area storing at least one stream file including the video data;
   a playlist area storing at least one playlist file including a plurality of playitems, a playitem representing a playing interval of a clip of the video data and indicating a presentation start time and a presentation end time of the playing interval; and
   a management area storing at least one title management information file including at least one segment, the segment including a command executing the playlist file, the title management information file being separate and having a different file extension from the playlist file,
   wherein the playing interval represented by the playitem is a unit to be randomized or shuffled during random/shuffle reproduction.

2. The recording medium of claim 1, wherein a title managed by the title management information file is a logical unit of the video data that is regarded as a reproduction unit by users.

3. The recording medium of claim 1, wherein the segment is assigned to a reproduction path of the video data.

4. The recording medium of claim 1, wherein the playitem is associated with a whole clip or a portion of clip based on clip information stored in a clip information area of the recording medium.

5. A method for recording a data structure for managing random/shuffle reproduction of video data on a recording medium, the method comprising:
- recording with a recording device at least one stream file including the video data in the recording medium;
- recording at least one playlist file in the recording medium, the playlist file including a plurality of playitems, a playitem representing a playing interval of a clip of the video data and indicating a presentation start time and presentation end time of the playing interval; and
- recording a title management information file in the recording medium, the title management information being separate and having a different file extension from the playlist file, the title management information file including at least one segment, the segment including a command executing the playlist file,
- wherein the playing interval represented by the playitem is a unit to be randomized or shuffled during random/shuffle reproduction.

6. A method for reproducing video data recorded on a recording medium having a data structure for managing random/shuffle reproduction of the video data thereon, the method comprising:
- reproducing with a reproducing device at least one title management information file including at least one segment from the recording medium, the title management information file including at least one segment, the segment including a command executing a playlist file;
- reproducing the playlist file executed by the segment from the recording medium, the playlist file being separate and having a different file extension from the title management information file, the playlist file including a plurality of playitems, a playitem representing a playing interval of a clip of the video data and indicating a presentation start time and a presentation end time of the playing interval; and
- reproducing a stream file including the video data from the recording medium;
- wherein the playing interval represented by the playitem is a unit to be randomized or shuffled during random shuffle reproduction.

7. An apparatus for recording a data structure for managing random/shuffle reproduction of video data on a recording medium, the apparatus comprising:
- a recording device configured to record data in the recording medium; and
- a controller, operably coupled to the recording device to,
- record a stream file including the video data on the recording medium,
- record at least one playlist file in the recording medium, the playlist file including a plurality of playitems, a playitem representing a playing interval of a clip of the video data and indicating a presentation start time and a presentation end time of the playing interval, the playitems in the playlist being a unit to be randomized or shuffled during random/shuffle reproduction, and
- record a title management information file in the recording medium, the title management information file being separate and having different file extension from the playlist file, the title management information file including at least one segment, the segment including a command executing a playlist file.

8. An apparatus for reproducing video data recorded on a recording medium having a data structure for managing random/shuffle reproduction of the video data thereon, the apparatus comprising:
- a reproducing device configured to reproduce data from the recording medium; and
- a controller operably coupled to the reproducing device to,
- reproduce a title management information file including at least one segment, the segment including a command executing a playlist file, from the recording medium,
- reproduce a playlist file executed by the segment from the recording medium, the playlist file being separate and having a different file extension from the title management information file, the playlist file including a plurality of playitems, a playitem representing a playing interval of a clip of the video data and indicating a presentation start time and a presentation end time of the playing interval, and
- reproduce a stream file including the video data from the recording medium,
- wherein the playing interval represented by the playitem is a unit to be randomized or shuffled during the random/shuffle reproduction.

9. The method of claim 5, wherein a title managed by the title management information file is a logical unit of the video data managed by the title management information file as a reproduction unit.

10. The method of claim 5, further comprising associating the playitem with a whole clip or a portion of clip based on clip information stored in the recording medium.

11. The apparatus of claim 6, wherein a title managed by the title management information file is a logical unit of video data that is regarded as a reproduction unit by users.

12. The apparatus of claim 6, further comprising associating the playitem with a whole clip or a portion of clip based on clip information stored in the recording medium.

13. The apparatus of claim 7, wherein a title managed by the title management information file is a logical unit of video data that is regarded as a reproduction unit by users.

14. The apparatus of claim 7, wherein the controller controls the reproducing device to reproduce the playitem associated with a whole clip or a portion of clip based on clip information stored in the recording medium.

15. The apparatus of claim 8, wherein a title managed by the title management information file is a logical unit of video data that is regarded as a reproduction unit by users.

16. The apparatus of claim 8, wherein the controller controls the reproducing device to reproduce the playitem associated with a whole clip or a portion of clip based on clip information stored in the recording medium.

17. The apparatus of claim 7, further comprising a source packetizer configured to packetize the video data.

18. The apparatus of claim 8, further comprising a source depacketizer configured to depacketize a packet of the video data.

\* \* \* \* \*